(12) United States Patent
Kiczales et al.

(10) Patent No.: US 6,539,390 B1
(45) Date of Patent: Mar. 25, 2003

(54) INTEGRATED DEVELOPMENT ENVIRONMENT FOR ASPECT-ORIENTED PROGRAMMING

(75) Inventors: Gregor J. Kiczales, Palo Alto, CA (US); Erik A. Hilsdale, Bloomington, IN (US); Cristina V. Lopes, San Francisco, CA (US); John O. Lamping, Los Altos, CA (US); James J. Hugunin, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/358,638

(22) Filed: Jul. 20, 1999

(51) Int. Cl.[7] .............................................. G06F 17/00
(52) U.S. Cl. ........................ 707/101; 707/102; 707/513
(58) Field of Search .................. 707/1–206, 500.1–530; 709/313–319

(56) References Cited

U.S. PATENT DOCUMENTS

| | | | |
|---|---|---|---|
| 6,424,974 B1 * | 7/2002 | Cotner et al. | 707/102 |
| 6,446,097 B1 * | 9/2002 | Glaser | 707/513 |
| 6,449,741 B1 * | 9/2002 | Organ et al. | 714/724 |

OTHER PUBLICATIONS

Furfaro et al., "Aspect oriented programming using actors", Distributed Computing Systems Workshops, 2002, Proceedings, 22nd International Conference on, 2002, pp. 493–498.*

Kellomaki, "Composing distributed systems from reusable aspects of behavior", Distributed Computing Systems Workshops, 2002, Proceedings, 22nd International Conference on, 2002, pp. 481–486.*

Pang et al., "An adaptive run time manager for the dynamic integration and interaction resolution of features", Distributed Computing Systems Workshops, 2002, Proceedings, 22nd International Conference on, 2002, pp. 445–450.* www.netobjects.com/company/html/pra17feb98b.html.*

Kiczales, G., Lamping, J., Mendhekar, A., Maeda, C., Lopes, C. V., Loingtier, J–M., Irwin, J., "Aspect–Oriented Programming", published in Proceedings of the European Conference on Object–Oriented Programming (ECOOP), Finland. Springer–Verlag LNCS 1241, Jun. 1997, (c) 1997.

* cited by examiner

Primary Examiner—David Jung

(57) ABSTRACT

A set of development tools is provided as part of an integrated development environment for supporting aspect-oriented programming such that aspects may easily be defined for embodying functionality which cross-cuts main program functionality in such a way that aspects transparently force their behavior on the main program. The editor and debugger of the integrated development environment embody functionality for accommodating this transparency.

18 Claims, 7 Drawing Sheets

INTEGRATED DEVELOPMENT ENVIRONMENT FOR ASPECT-ORIENTED PROGRAMMING

This invention was made with Government support under Contract F30602-97-C-0246 awarded by the Air Force. The Government has certain rights in this invention.

FIELD OF THE INVENTION

The present invention relates generally to system for creating software, and more particularly to tools for an aspect-oriented integrated development environment.

BACKGROUND OF THE INVENTION

Procedural languages such as for Fortran, Pascal, and C are useful for defining programs where the execution is straightforward, beginning at a starting point and executing in a stepwise manner to an end. In this model, design issues can be addressed by units of contiguous program execution. Deviations from the straightforward path are provided by function calls which allow program execution to jump from the main routine to the subroutine, and back again to the main routine. The use of subroutines allows for programming efficiency for implementing common routines; however, with programs becoming increasingly more complicated, and the number of common routines also growing, programs written in procedural languages are becoming increasingly complicated and difficult to maintain.

With modern computer programs becoming increasingly long and complex creations which may have many millions of lines of code, the concept of modularity is becoming increasingly important in the development of software. With a modular approach, the various functions of a computer program may be separated into modules which various programmers can work on independently. One popular programming paradigm that embodies the concept of modularity is that of object-oriented programming (OOP).

The central idea behind object-oriented programming is the object model, where all programs are structured as collections of interrelated objects, each of which represents an instance of some class in a hierarchy of object classes.

Object-oriented programming involves defining, creating, using, and reusing "objects," which can be used to model ideas and things in terms of their features (data) and behaviors (methods). Each object is a self-contained software element including data and methods for operating on the data. Objects are created by defining object classes from which objects are created, or "instantiated." The object classes are templates for creating objects. Each object created from a particular object class includes all the data and methods of the object class, as well as data and methods from its superclasses, and different objects of the same object class may be used for different purposes. Common object-oriented programming languages include Smalltalk, C++, and Java.

Other, non-OOP approaches are also commonly used, such as embodied in procedural programming languages and functional programming languages.

When design features may be cleanly divided among distinct elements, these approaches provide good support for programming those features in a modular way. However, these approaches fail to provide the proper support in certain situations, such as those involving shared resources, error handling, or other systemic issues where the same or similar functionality affects or is affected by many different elements.

The reason why these approaches are insufficient is that those issues cross-cut the primary modularization of the systems. Cross-cutting occurs when some particular concern depends on and/or must affect parts of the implementation of several of the functional modules of the system. Functional modules may include such software entities as objects and program modules, among others, and cross-cutting may occur across different software entities, in different places within the same software entities, or a combination of the two. Many cross-cuts are not weaknesses of the designs; they are a natural and unavoidable phenomena in complex systems, and they are the basis for the concept of "aspect".

Implementing those crosscutting concerns in traditional programming languages, even object-oriented ones, typically requires scattering bits of code throughout the program, resulting in code that is referred to as "tangled."

For example, non-trivial performance optimizations tend to cross-cut many modules when writing programs using traditional programming languages. So, for example, using Lisp or Java, the implementation of a cross-cutting performance optimization ends up affecting the non-optimized, modular implementation of the components in ways that are all but obvious, resulting in code that is tangled and in loss of the optimization abstraction.

An aspect is a concern that cross-cuts the primary modularization of a software system. An aspect-oriented programming language extends traditional programming languages with constructs for programming aspects. Such constructs can localize the implementation of cross-cutting concerns in a small number of special purpose program modules called aspects, rather than spreading the implementation of such concerns throughout the primary program modules. As with other types of software elements, an aspect may include both data and methods.

In order to capture the cross-cutting nature of aspects, such special program modules break the traditional rules of encapsulation in principled ways. They can affect the implementation of software entities implementing primary functionality without the explicit consent of those software entities; further, they can do that for several software entities simultaneously.

Aspect oriented programming (AOP) extends the expressive facilities available to the programmer, so that many design decisions can be expressed locally. The AOP programmer writes the base program in a traditional programming language, and also writes pieces of aspect code, each of which affects executions that are described in some parts of the base program.

In such a manner, aspect code can localize the implementation of some design patterns in a few modules, rather than spreading the fields and methods of those patterns throughout the classes, and can capture the tracing, debugging and instrumentation support for a complex system in a few modules, capture error handling protocols involving several classes in a single module, and capture resource sharing algorithms involving several classes in a single module, rather than as multiple code fragments tangled throughout the classes.

The special program modules for programming aspects enable this by cross-cutting the modularity of classes in principled ways. So one of those special program modules can affect the implementation of several classes (or several methods within a single class) in a clean, principled way. Aspect-Object interaction differs from Object-Object interaction and other traditional programming paradigms in that with the traditional approaches, all modifications of objects are accomplished in response to a request from the object to be modified by another object or software entity. In the AOP environment, on the other hand, the object or main program body is unaware of the aspect code because aspects contain all information concerning the modifications. Instead, the aspect code maintains all information concerning all modifications. This behavior may be described as an aspect transparently forcing its behavior on a software entity.

The paradigm of Aspect-Oriented Programming (AOP) was first introduced in Gregor Kiczales et al., *Aspect-Oriented Programming* in *Proceedings of the European Conference on Object-Oriented Programming (ECOOP 97)*, June 1997 ("Kiczales"), which is hereby incorporated by reference. A new unit of software modularity, called an aspect, is provided that appears to provide a better handle on managing cross-cutting concerns.

In Kiczales, only highly domain-specific aspect-oriented systems had been developed. It also addresses a goal of developing a general purpose AOP mechanism. However, it remains unknown in the art how to generalize from the very specific examples of AOP to arrive at the necessary abstractions to create a general model. Thus, aspect-oriented programming has remained a hypothetical paradigm having the goal of providing a clean separation between and among components and aspects.

SUMMARY OF THE INVENTION

The present invention provides an integrated set of tools for aiding an AOP programmer to develop software in an aspect oriented programming environment. In particular an editor and debugger are provided which are useful in assisting a developer to create programs using aspect-oriented techniques. The environment of the present invention is referred to as AspectJ.

AspectJ is an extension to the object-oriented Java programming language. In AspectJ, object code is encapsulated in Java classes, and aspect code is encapsulated in special program modules called "aspects".

Those skilled in the art will readily appreciated that, while the following discussion of aspect-oriented programming will be in terminology usually associated with object-oriented programming, the concepts of aspect-oriented programming taught in the present invention may be practiced with other programming paradigms without departing from the spirit of the invention.

DETAILED DESCRIPTION OF THE INVENTION

In accordance with the present invention, the system of the present invention executes on a computer, such as a general purpose personal computer of a type well-known in the art.

The present invention is a system for facilitating the development of software programs using aspect-oriented techniques. A software program will typically be in the form of byte code compiled from one or more software entities defining primary program functionality, as well as one or more aspects defining cross-cutting issues. An integrated development environment is provided which allows a user to quickly and easily create and debug aspect-oriented programs. The integrated development environment according to a present embodiment of the invention is implemented as computer software which may be installed directly on a local computer used for practicing the invention, such as by loading the software from non-volatile storage, or may be downloaded from one or more remote sites and installed on the local computer, or may even be installed from one or more remote computers.

Integrated Development Environment

As was known in the prior art, for some very specific cross-cutting issues, it is desirable to separate functionality from certain other concerns. The prior art was able to achieve the separation of functionality from certain other concerns into clean modules in a number of very domain specific applications. What was unknown was how to best achieve this separability in a general way. In a present embodiment of aspect-oriented programming according to the present invention, all references between aspects and object classes in program source code are limited to the aspect definitions, and do not appear in any object class definitions. Thus, the effects of the aspects are transparent to the objects, i.e., the instances of object class definitions in memory, and the aspects, i.e., the instances of aspect definitions in memory, act by forcing their behavior on the objects. A software development environment for implementing such an aspectoriented programming system must therefore include a facility for keeping track of how aspects affect objects.

Figure 1:
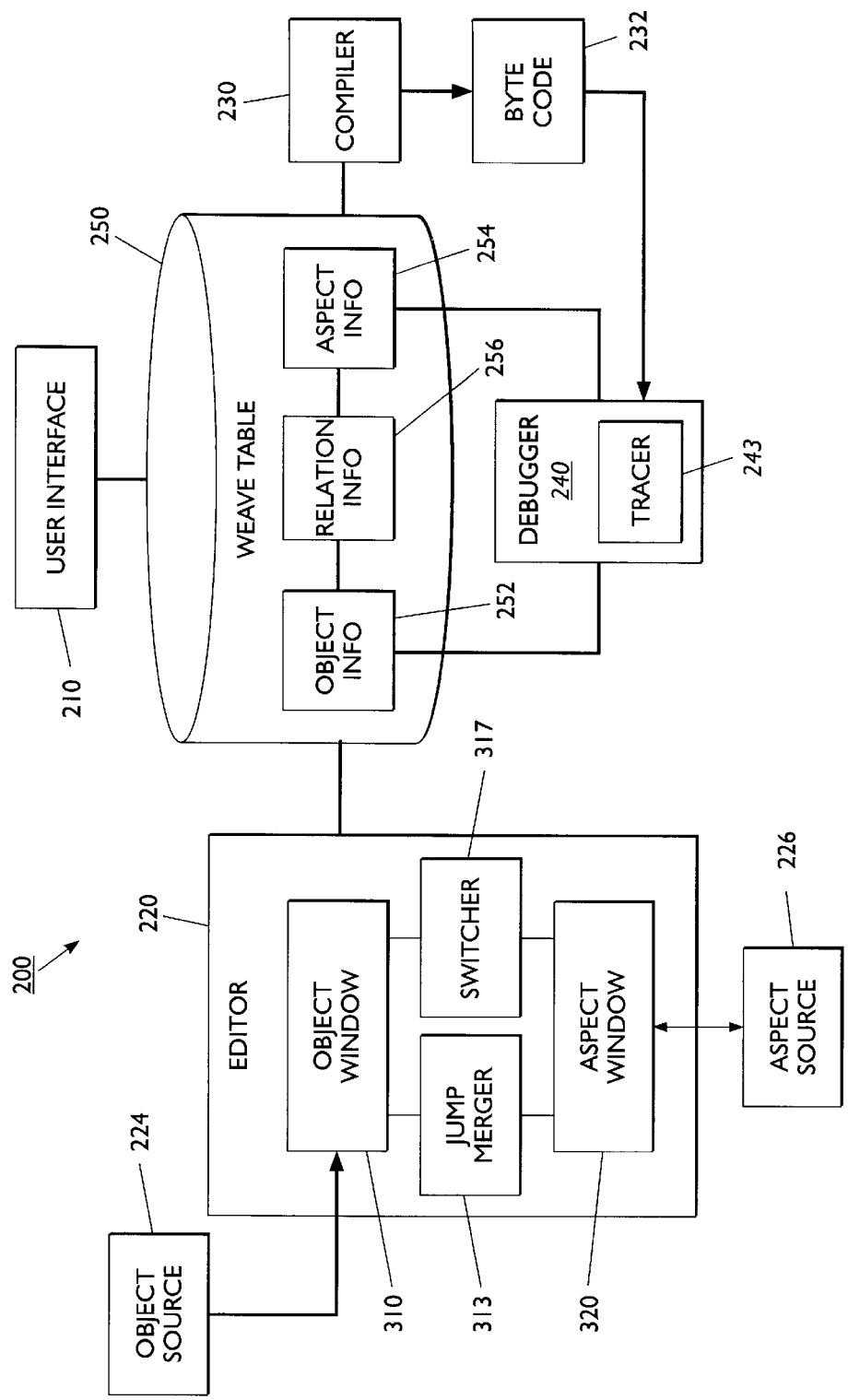
FIG. 1 is a block diagram illustrating elements of an integrated development environment according to the present invention.

In FIG. 1, an exemplary integrated development environment 200 according to the present invention is shown. An integrated development environment (IDE) typically refers to a set of integrated tools for developing software. The tools are generally run from a single user interface 210, but each tool may also be implemented with its own user interface. An IDE typically includes at least an editor 220, a compiler 230, and a debugger 240, but may also include other tools for facilitating the development of software. In the IDE 200 of the present invention, a weave table 250 is also included. The weave table 250 is used in the present invention to keep track of relationships between aspects and objects. The weave table 250 includes object information 252, aspect information 254, and a relationship information 256. The relationship information 256 will include information relating the functions of the aspects to the functions of the object classes they modify. The weave table may be constructed in different ways, such as by examining the aspect definitions to determine which objects they modify, and in what manner. In a present embodiment of the invention, the weave table is maintained independently of objects such that objects may be kept completely unaware of any aspectoriented information.

The editor 220 and compiler 230 according to a present embodiment of the invention communicate with the entire weave table 250. The debugger may also communicate with the entire weave table, but needs to access the object information 252, and the aspect information 254. Relationship information between aspects and objects is not necessary for a proper functioning of the debugger 240.

The Development Cycle

Figure 2:
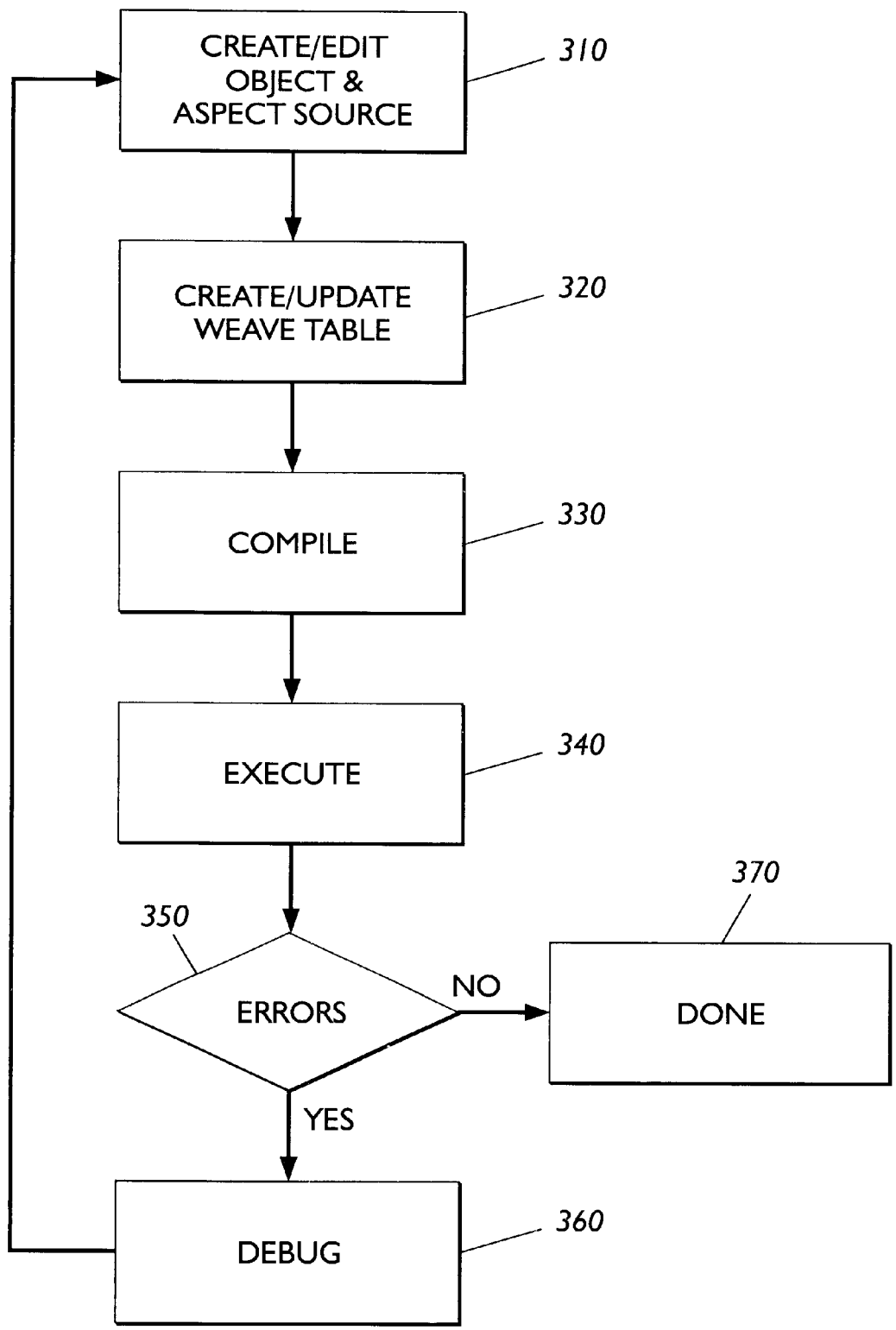
FIG. 2 is a flowchart depicting a method for creating a software program according to the present invention.
Figure 3:
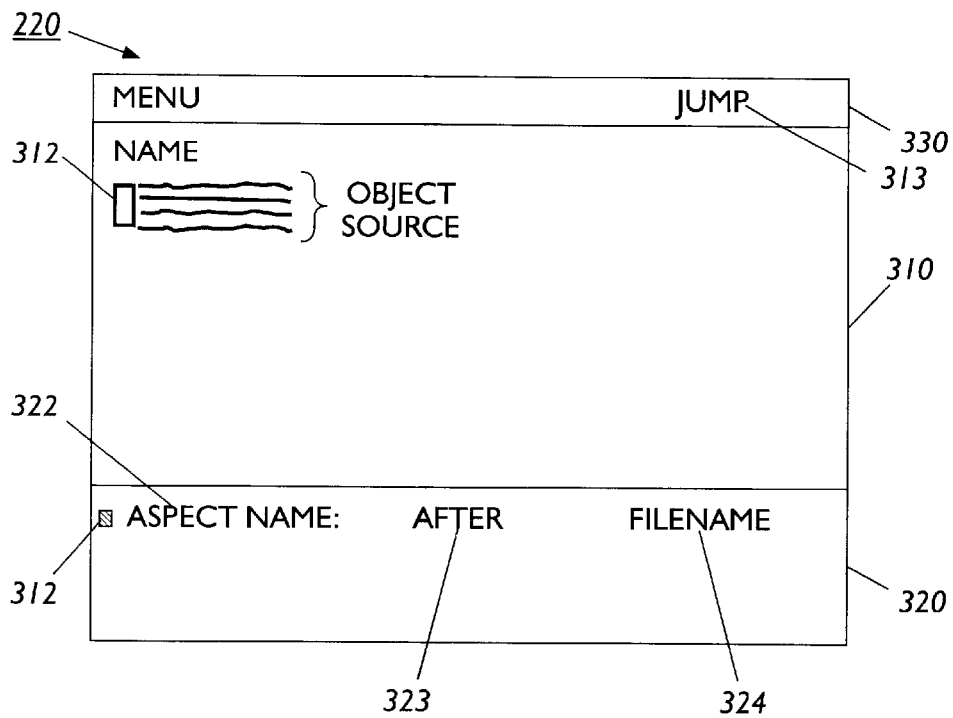
FIGS. 3 through 8 depict various features of an editor according to an embodiment of the present invention.

Referring to FIGS. 2 and 3, source files for object class definitions 224 and aspect definitions 226 are created using the editor 220 at step 310. The editor 220 may be accessed through a graphical and/or text-based user interface 210, which may be unique to the editor 220, or common to the IDE 200.

While in the present discussion, and as shown in FIG. 2, a weave table 250 is constructed at step 320, and is then followed by compilation at step 330, the weave table construction may also be performed as part of compilation. Alternatively, the weave table 250 may be created and/or updated as the aspect definition source files 226 are created and/or edited.

The weave table 250 is created by analyzing the object class definition source files 224 and aspect definition source files 226 of the software application. A weave table 250 is provided which includes object information 252, aspect information 254, and relationship information 256, all of which are used by the editor 220 and the compiler 230. The debugger 240 needs only the object information 252 and aspect information 254. The relationship information 256 will include information relating the modifying portions of the aspects to the portions of the object classes they modify. In a present embodiment, one or more relationship tables are used to store the relationship information, each of which has storage structures for object, aspect, and relationship information, but those skilled in the art will readily appreciate that a single table could be used without departing from the spirit of the invention.

After construction of the weave table 250, at step 330, the compiler 230, concurrently processes the object class definition source files 224 and aspect definition source files 226 into compiled byte code 232, ensuring that all the aspect effects are handled properly. The byte code 232 is typically a program which may be executed directly by the processor, or may be executed after being linked to appropriate runtime or other libraries (not shown). A byte code program is also commonly referred to as an object file or an executable file.

The compilation is generally performed according to well-known practices in the art. However, since many compilers can only provide references in the byte code to a single source file, an offsetting scheme is used to indicate whether the source code corresponding to a particular line of byte code originates in an object class definition source program 224 or an aspect definition source program 226. For example, the lines of a 20,000-line object class definition source program might be referenced by line numbers 1 through 20,000, while the lines of an aspect definition source program would be offset by 20,000, to start at 20,001. Line numbering for additional aspect definition source programs would be further distinguished by other offsets chosen to avoid any possible overlapping line numbers.

After compilation, the compiled code is executed at step 340. If no errors are found at step 350, then the development process is complete at step 370. However, with complex software programs, errors will typically be found, and debugging will be performed at step 360 to locate errors, using the debugger 240, and the editor is used again to make corrections to the object class definition source files 224 and/or aspect definition source files 226. The development cycle is repeated until a sufficiently error-free program results, and the process ends at step 370.

While the description of the present invention uses terminology from object-oriented programming, and a present embodiment of the present is implemented as an extension to the Java object-oriented programming language, those skilled in the art will recognize that the aspect-oriented programming principles of the present invention can be applied to any programming paradigm without departing from the spirit or scope of the invention.

Editor

The following discussion relating to an editor makes references to object classes and functions. The details of these classes and functions are disclosed in Tables 1–3 of copending patent application, U.S. Ser. No. 09/357,738, entitled ASPECT-ORIENTED PROGRAMMING, filed concurrently with the present application and assigned to the present assignee, and that is hereby incorporated into the present specification by reference.

In a present embodiment of the invention, a single display mode is provided in which only a single window is displayed, where a user may switch between the object window 310 and the aspect window 320 using a display switcher 317. In addition, a dual display mode is provided in which both the object window 220 and the aspect window 320 are displayed simultaneously. While the object window and aspect window are shown with the object window above the aspect window in FIGS. 3 through 8, those skilled in the art will recognize that any relative positioning of the windows may be used without departing from the spirit and scope of the present invention.

Referring to FIG. 3, a list of aspects is shown in the aspect window 320. The list of aspects is used to display the aspects which modify the object class in the corresponding object window 310. The object window 310 is an object edit window in which, for example, source code for the object class Point is displayed and may be edited. This source code is shown in Table 1 of copending patent application Ser. No. 09/357,738. A cursor 312 is shown positioned next to a function of the object class as selected by a user. The corresponding line of source code may be highlighted but highlighting is not necessary for proper operation of the present invention. The cursor 312 is used to indicate a function of interest in the object class. The aspect window 320 is an aspect list window displaying an aspect name 322 for each aspect which modifies the function of interest, as well as an indicator 323 of how the aspect affects the function, and a filename 324 indicating where the aspect is located. If no function is selected from the object class definition, then all aspects affecting any part of the object class are displayed in the aspect window 320. An aspect may affect an object function either statically or non-statically, and may do so either before or after the object function has been performed. In the example code shown in Table 3 of copending patent application Ser. No. 09/357,738, aspect AutoReset affects the function Point non-statically, after the object function has been performed. The static versus non-static modification of objects by aspects is very similar to the static versus non-static modification of objects by other objects in an object-oriented system. When an aspect's effect is static, the aspect affects all objects, but if the aspect's effect is non-static, then the aspect affects only specific objects. Static and non-static effects as applied to object-oriented environments are described in greater detail in James Gosling et al., *The Java™ Language Specification,* Addison-Wesley, 1996, which is hereby incorporated by reference.

Figure 4:
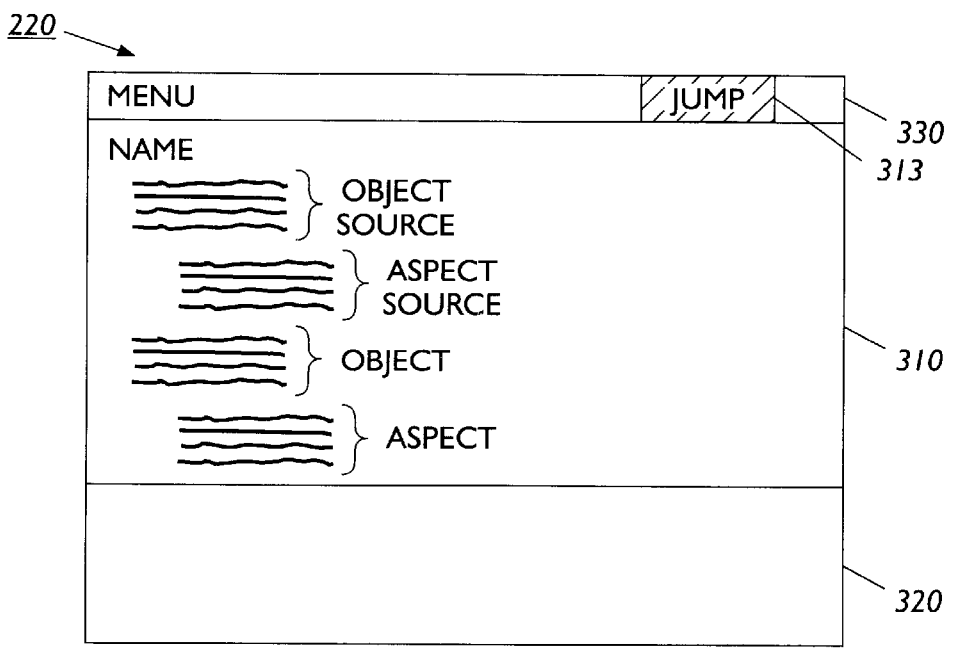

Referring to FIG. 4, if the user desires to see, in more detail, how an aspect will affect an object in memory, the user may select an aspect definition, such as by left-clicking on the aspect name, from the aspect window 320. After selecting an aspect, the user may select a Jump function 313 from a menu bar 330 provided along the top edge of the object window 310. The Jump function 313 acts as code merger, but only displays the source code of the aspect definition in the object window 310 in appropriate places along with the source code for the object class definition rather than actually merging the code. As can be seen in FIG. 4, the object source code and aspect source code have different appearances to allow a user to easily distinguish between the two. In FIG. 4, the aspect source code is shown indented from the object source code and in italics, but those skilled in the art will appreciate that other differing display characteristics, such as different type fonts, colors, sizes, and others, may be used without departing from the spirit of the invention.

Figure 5:
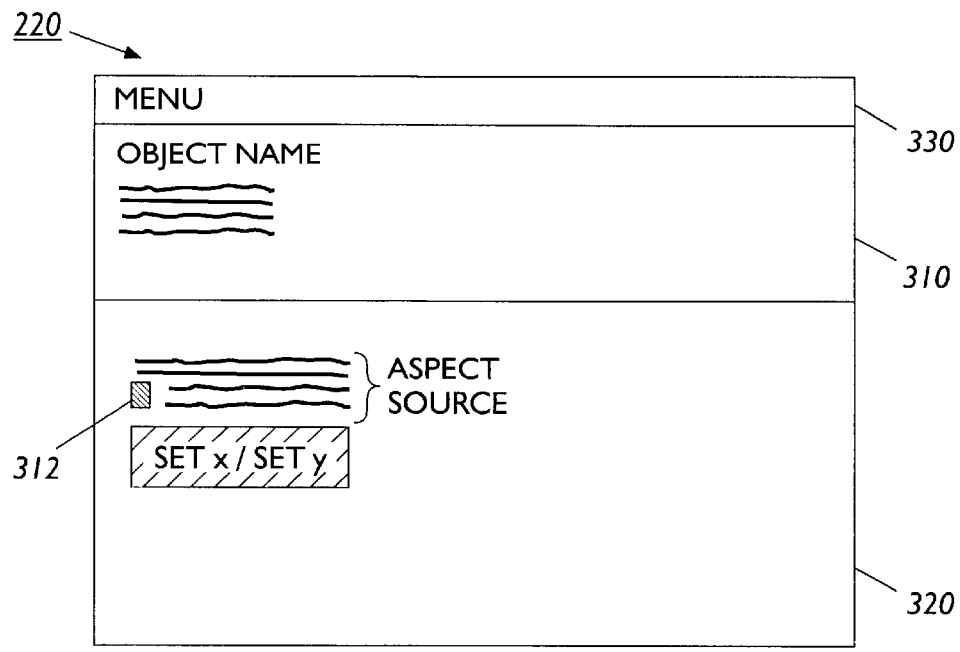

Referring to FIG. 5, a first alternative display arrangement according to the present invention is shown. In this display arrangement, the aspect window 320 is an aspect edit window in which source code for an aspect definition is displayed and may be edited. The corresponding object window 310 is an object list window showing all the object classes which are modified by the aspect in the aspect window 320. A user may select a particular function from the aspect definition in the aspect window 320 such as by moving the cursor 312 over the desired function and then left-clicking using the mouse. Upon selection of the function, the object window 310 is updated to display only those object classes modified by the selected aspect function. In alternative embodiments of the present invention, the particular object functions modified by the aspects may be shown in the object window 320, as well as how they are modified.

Figure 6:
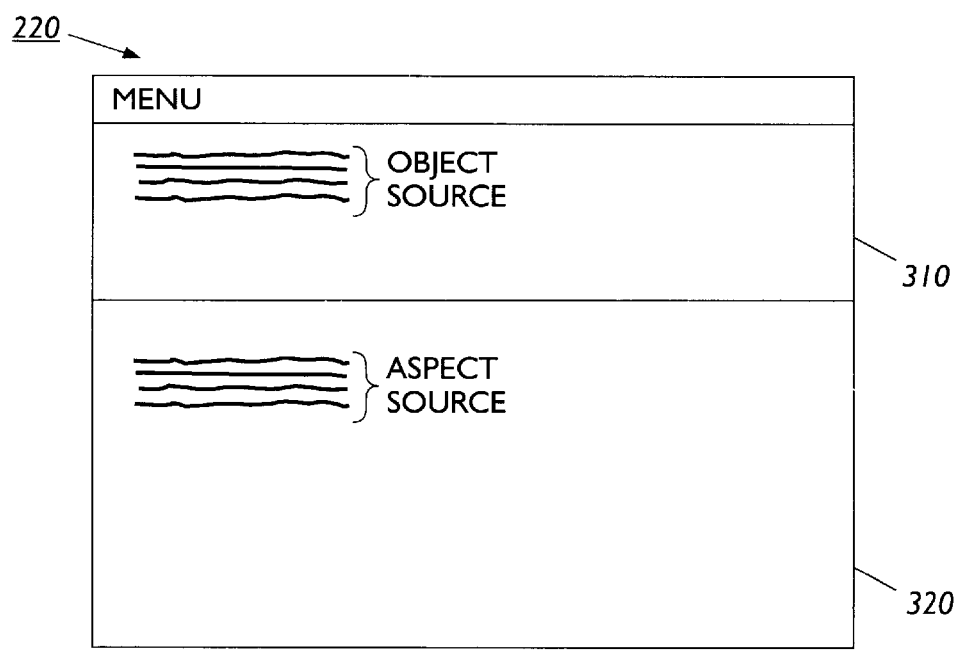

Referring to FIG. 6, a second alternative display arrangement according to the present invention is shown. This display arrangement combines an object window 310 as an object edit window with an aspect window 320 as an aspect edit window.

Figure 7:
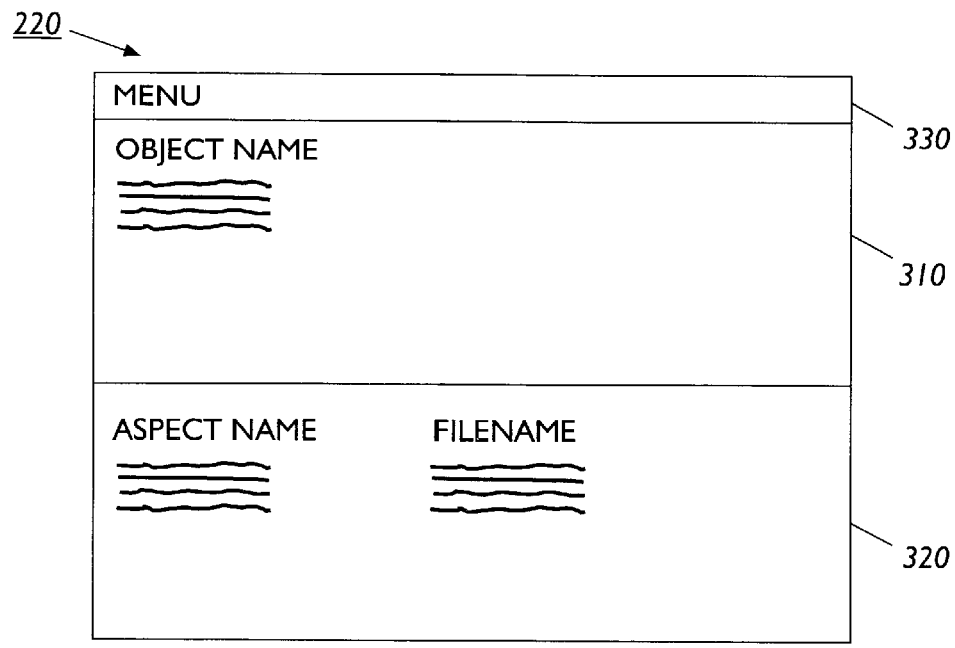

Referring to FIG. 7, a third alternative display arrangement according to the present invention is shown. In this display arrangement, the object window 310 is an object list window, and the aspect window 320 is an aspect list window. In this display arrangement the editor 220 displays all the object classes and aspects involved in the software being developed. This display arrangement provides an overview to the software program being developed, and can be used as an initial screen. This overview display may be show in a textual format, as shown in FIG. 7, or graphically as shown in FIG. 8, as discussed below.

Figure 8:
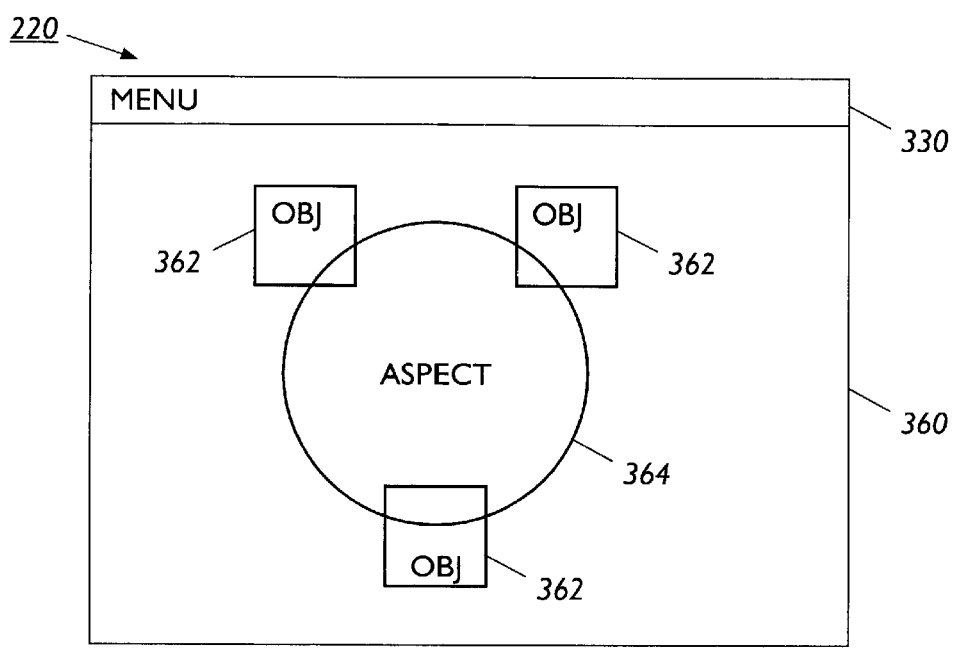

Referring to FIG. 8, a fourth alternative display according to the present invention is shown. In this embodiment, a graphical display window 360 is provided to allow a user to quickly visualize the relationships between aspects and object classes. In the example shown in FIG. 8, object classes are represented as rectangular shapes 362, and aspects are represented as round shapes 364. The overlapping of aspect representations on object representations shows which object classes are modified by which aspects. One skilled in the art will readily appreciate that object classes and aspects may be represented with any number of different shapes, or by the same shapes in different colors, or by any other manner which allows a user to discriminate between the two, without departing from the spirit of the invention. Further, other visual cues or display arrangements may be used than overlapping shapes, such as connections of different shapes using lines, and others.

Compiler

The forcing of an aspect's behavior on an object class is accomplished using a compiler that is aspect-oriented, i.e., one that can handle aspects. Such a compiler concurrently compiles the object class definitions and aspect definitions of a system such that the code from the aspects affects the behavior of the objects. An exemplary compiler 230 according to the present invention may be created using well-known preprocessing techniques to implement program transformations, which are described in greater detail in copending patent application, U.S. Ser. No. 09/357,738, entitled ASPECT-ORIENTED PROGRAMMING, filed concurrently with the present application and assigned to the present assignee, and is hereby incorporated into the present specification by reference.

Debugger

Figure 9:
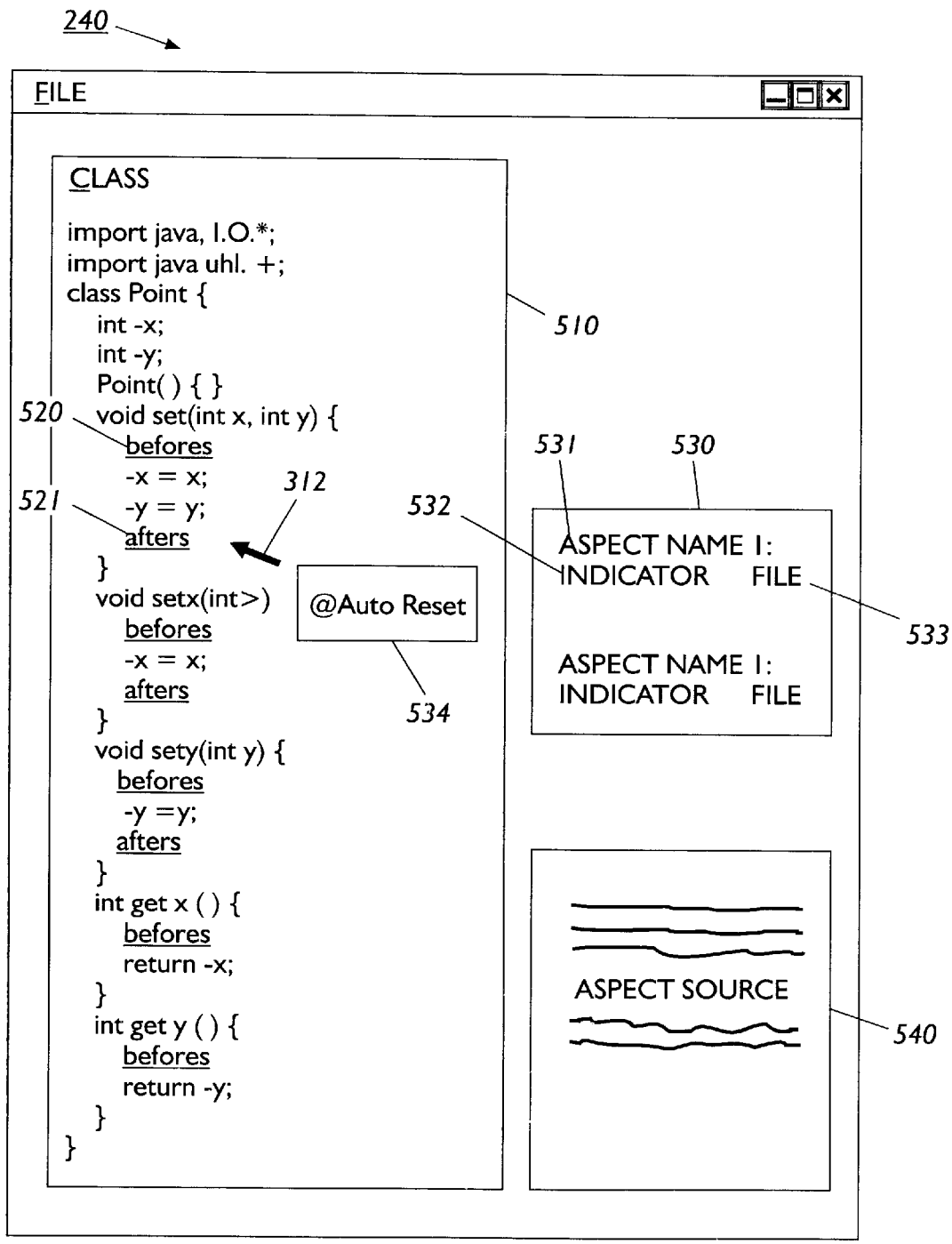
FIG. 9 depicts features of a debugger according to an embodiment of the present invention.

Referring to FIG. 9, a debugger 240 according to the present invention is provided with a tracer 243 (FIG. 1) for tracing the execution of a method, a main window 510 for displaying the source code for an object class definition. The debugger 240, referencing the object information 252 and aspect information 254 in the weave table 250 (FIG. 1), also displays aspect indicators 520 and 521 in appropriate locations of the source code. For instance, aspect indicator 520 denotes the aspects which modify the function of Point before execution of set(int x, int y), and aspect indicator 521 denotes the aspects which modify the function of Point after execution of set(int x, int y).

When a user selects an aspect indicator, such as by right-clicking over the aspect indicator with a mouse or other pointing device, the debugger 240 pops up an aspect list window 530 displaying a list of all the aspects associated with that aspect indicator. As with the editor 220, the aspect list window for the debugger includes an aspect name 531 for each aspect that is associated with the aspect indicator, as well as an indicator 532 of whether the aspect's effect is static or dynamic, and a filename 533 indicating where the aspect is located. In present embodiments of the invention, instead of, or in addition to displaying an aspect list window 530 when an aspect indicator is selected, a smart tip 534 feature is implemented wherein a list of aspects associated with the aspect indicator is displayed when the cursor 312 is within a certain distance of an aspect indicator.

From the aspect list window 530, a user may select an aspect to examine more closely. After selecting an aspect, such as by left-clicking over the aspect name with the mouse or other pointing device, an aspect code window 540 pops up to display the source code definition of the selected aspect.

In a present embodiment of the invention, if only one aspect is associated with the aspect indicator, the debugger 240 pops up the aspect code window directly, rather than displaying an aspect list with only a single aspect.

Figure 10:
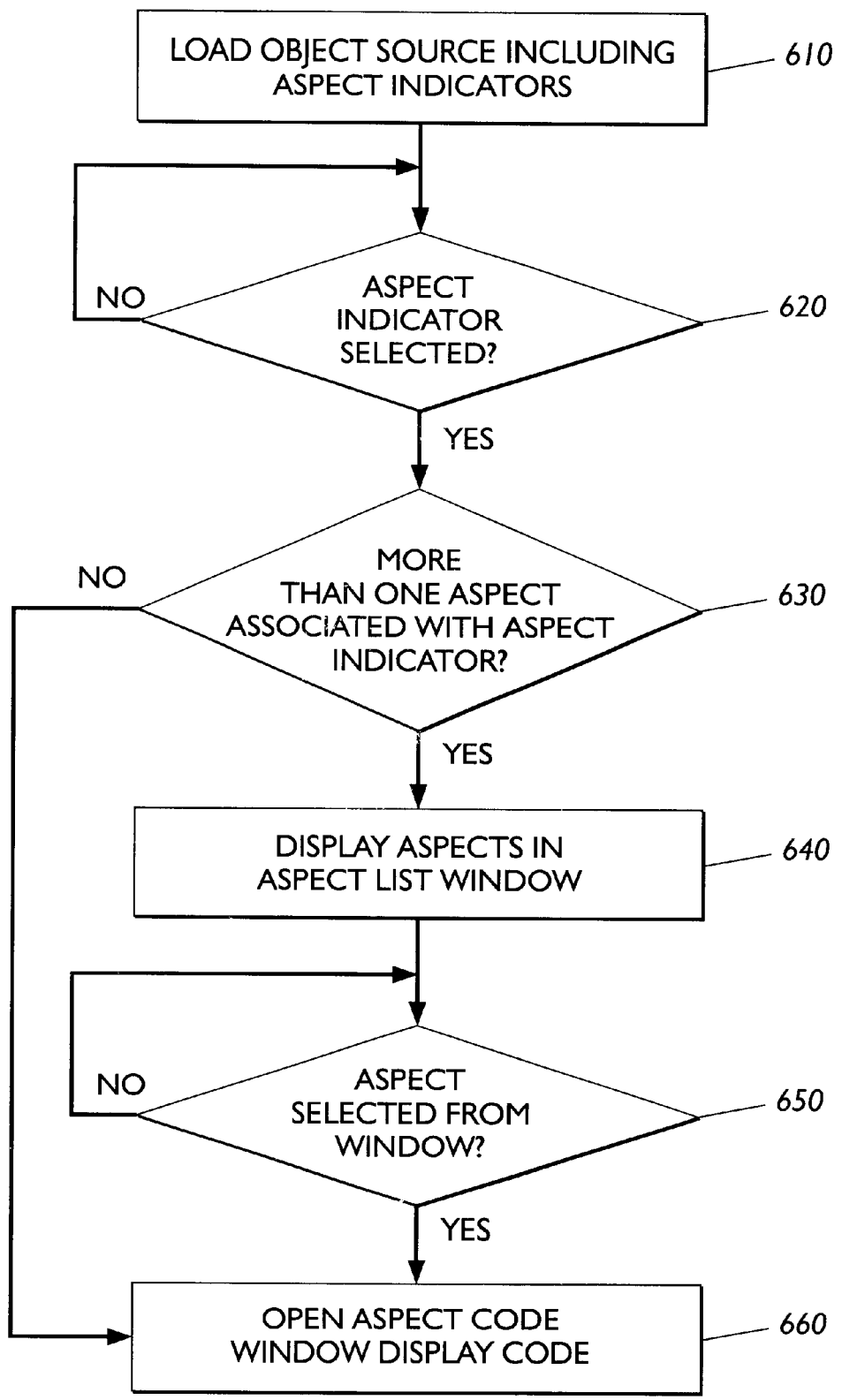
FIG. 10 is a flowchart depicting a method for debugging a software program according to the present invention.

Referring to FIG. 10, a user debugs an aspect-oriented program using the debugger 240, by loading an object class definition and displaying the source code, along with aspect indicators 520, 521 in the main window 510 at step 610. When the user selects an aspect indicator at step 620, a determination is made, at step 630, of the number of aspects that are associated with the selected aspect indicator. This determination may be made using information from the weave table. If more than one aspect is associated with the aspect indicator, then an aspect list window 530 is displayed at step 640 listing all the aspects associated with the aspect indicator. Then, upon a user selection of an aspect from the aspect list window 530 at step 650, the aspect code window 540 is opened to display the corresponding aspect definition source code 226.

If, at step 630, only a single aspect is associated with the selected aspect indicator, then the debugger 240 opens the aspect code window directly, at step 660, without the intervening aspect list window 530.

While the present invention has been described in relation to an object-oriented environment, those skilled in the art will appreciate that these techniques may readily be applied to other programming paradigms without departing from the spirit and scope of the present invention.

What is claimed is:

1. In a computer system having a processor, a display, and memory, the memory including an operating system, an aspect-oriented programming (AOP) integrated development environment (IDE) for creating a software program, wherein AOP supports defining a software entity, the software entity comprising either a program body or one or more object classes, the software entity defining an overall functionality of the software program, the AOP further supporting defining an aspect which embodies functionality which cross-cuts the overall functionality of the software entities, wherein the aspect transparently forces its behavior on the software entity, the IDE comprising:
  a) a user interface for interacting with a user to:
    i) create a software entity for defining the overall functionality of a software program, the software entity comprising computer executable code which performs one or more functions; and
    ii) create an aspect comprising computer executable code which defines cross-cutting functionality to transparently force a modification of the overall functionality of the software entity; and
  b) a data structure for maintaining information regarding relationships between the aspect and the software entity, wherein information relating the aspect and the software entity resides only in one or more of the aspect and the data structure, wherein the data structure is independent of the software entity, and wherein the data structure can be utilized by the user interface.

2. The development environment of claim 1, further comprising an editor, the editor comprising:
  a software entity display which displays a representation of the software entity; and
  an aspect display which displays a representation of an aspect which modifies the software entity.

3. The development environment of claim 2, wherein the editor further comprises a display switcher that switches between the software entity display and the aspect display.

4. The development environment of claim 3, wherein the display switcher switches between the software entity display and the aspect display in response to a command from the user.

5. The development environment of claim 2, wherein the editor further comprises a code merger that displays source code from the aspect modifying the software entity along with source code from the software entity.

6. The development environment of claim 5, wherein the aspect and the software entity remain separate.

7. The development environment of claim 5, wherein the code merger represents the functionality information from the aspect as a link to a location in the aspect where the functionality information resides, and in response to a user selection of the link, displays the functionality information from the aspect along with the source code from the software entity.

8. The development environment of claim 5, wherein the source code from the aspect is displayed using a different display characteristic than that used to display the source code from the software entity.

9. The development environment of claim 2, wherein the aspect display includes a display mode which displays a representation of at least one aspect that modifies the software entity.

10. The development environment of claim 2, wherein the editor includes a dual display mode in which the software entity display and the aspect display are displayed simultaneously.

11. The development environment of claim 2, wherein the user interface is a graphical user interface (GUI), the GUI comprising:
  an software entity window displaying an iconic representation of an software entity being edited; and
  an aspect window displaying an iconic representation of an aspect which modifies the software entity.

12. The development environment of claim 11, wherein visual cues are displayed in one or more of the software entity window and the aspect window, indicating how the aspect modifies the software entity.

13. The development environment of claim 1, further comprising a debugger, the debugger comprising:
  a tracer that traces execution of a method of a software entity and a method of an aspect that modifies a function of the software entity method, the tracer:
    maintaining a correspondence link associating a portion of byte code provided by the aspect and a corresponding portion of source code in the software entity; and
    upon encountering the portion of byte code provided by the aspect, updating the correspondence link to associate the portion of byte code that was provided by the aspect to a corresponding portion of source code in the aspect.

14. The development environment of claim 13, the debugger further comprising a main window which displays source code for the software entity along with one or more aspect indicators which indicate where aspects modify the software entity.

15. The development environment of claim 14, wherein, in response to a user selection of one of the one or more an aspect indicators, the debugger displays a list of aspects associated with the selected aspect indicator.

16. The development environment of claim 15, wherein, in response to a user selection of an aspect from the list of aspects, the debugger displays source code for the selected aspect.

17. A computer-readable medium for use a computer system having a processor, a display, and memory, the memory including an operating environment, the computer-readable medium having computer-executable instructions for performing the process of:
  a) providing a user interface for interacting with a user to:
    i) create a software entity for defining the overall functionality of a software program, the software entity comprising computer executable code which performs one or more functions; and
    ii) create an aspect comprising computer executable code which defines cross-cutting functionality modifying the overall functionality of the software entity, wherein the aspect transparently forces the cross-cutting functionality on the software entity; and
  b) providing a data structure for maintaining, for each software entity, information regarding relationships between aspects and software entities, wherein information relating the aspect and the software entity resides only in the data structure, the data structure is independent of the software entity, and wherein the data structure can be utilized by the user interface.

18. A method for transferring a computer program product from one or more first computer to a second computer connected to the one or more first computers through a communications medium, the method comprising:

a) accessing, on the one or more first computers, computer-executable instructions, which, when run on a computer having an operating environment, perform the steps of:

1) providing a user interface for interacting with a user to:

i) create a software entity for defining the overall functionality of a software program, the software entity comprising computer executable code which performs one or more functions; and ii) create an aspect comprising computer executable code which defines cross-cutting functionality modifying the overall functionality of the software entity, wherein the aspect transparently forces the cross-cutting functionality on the software entity; and 2) providing a data structure for maintaining, for each software entity, information regarding relationships between aspects and software entities, wherein information relating the aspect and the software entity resides only in the data structure, the data structure is independent of the software entity, and the data structure can be utilized by the user interface; and b) transferring the computer-executable instructions from the one or more first computers to the second computer.

* * * * *